US007012940B2

(12) United States Patent
Tamaki et al.

(10) Patent No.: US 7,012,940 B2
(45) Date of Patent: Mar. 14, 2006

(54) LASER RESONATOR AND ADJUSTMENT METHOD

(75) Inventors: Yusuke Tamaki, Tokyo (JP); Hitoshi Sekita, Tokyo (JP); Kazuya Takasago, Tokyo (JP); Taisuke Miura, Kanagawa (JP)

(73) Assignee: Cyber Laser Inc., Tokyo (JP)

( * ) Notice: Subject to any disclaimer, the term of this patent is extended or adjusted under 35 U.S.C. 154(b) by 81 days.

(21) Appl. No.: 10/619,303

(22) Filed: Jul. 14, 2003

(65) Prior Publication Data

US 2004/0066828 A1    Apr. 8, 2004

(30) Foreign Application Priority Data

Jul. 15, 2002   (JP)   ............................. 2002-206326

(51) Int. Cl.
*H01S 3/00*   (2006.01)
(52) U.S. Cl. ........................... 372/33; 372/98; 372/101
(58) Field of Classification Search .................. 372/33, 372/98, 101, 92
See application file for complete search history.

(56) References Cited

U.S. PATENT DOCUMENTS

| 5,200,965 | A | | 4/1993 | Okuyama et al. | ...... 372/29.022 |
|---|---|---|---|---|---|
| 5,546,222 | A | * | 8/1996 | Plaessmann et al. | ........ 359/346 |
| 5,757,842 | A | * | 5/1998 | LaPlante et al. | ............... 372/98 |
| 5,892,789 | A | * | 4/1999 | Yasui et al. | .................... 372/68 |
| 5,912,912 | A | * | 6/1999 | Caprara et al. | ................ 372/25 |
| 6,700,698 | B1 | * | 3/2004 | Scott | ........................... 359/347 |

* cited by examiner

*Primary Examiner*—Minsun Oh Harvey
*Assistant Examiner*—James Menefee
(74) *Attorney, Agent, or Firm*—Pearne & Gordon LLP

(57) ABSTRACT

The present invention has the object of offering a laser resonator capable of maintaining high amplification efficiency even if the thermal lensing effect occurring in the laser medium varies during operation or over repeated operation and suspension of the laser device. The laser resonator comprises at least a pair of reflection portions (planar reflective mirrors 3) provided such as to allow a laser beam to oscillate therebetween; a laser medium provided on the optical path of the laser between the pair of reflection portions; an excitation portion (excitation laser device 5) for exciting the laser medium; an optical system (convex lens 1) provided on the optical path of the laser beam between the laser medium and the pair of reflection portions for changing the state of the laser in the laser medium; and a movement portion for moving the optical system along the optical axis of the laser.

5 Claims, 2 Drawing Sheets

– PRIOR ART –

(a)         (b)

– PRIOR ART –

LASER RESONATOR AND ADJUSTMENT METHOD

BACKGROUND OF THE INVENTION

The present invention relates to a laser resonator which is suitable for use in a laser regenerative amplifier, more specifically to preventing drops in efficiency of laser resonators due to thermal lensing of laser media.

FIG. 3 is a schematic view of a regenerative amplifier using a conventional laser resonator.

In FIG. 3, 103 denotes a planar reflective mirror, 104 denotes a laser medium, 105 denotes an excitation laser device, 106 denotes a laser, 108 denotes an excitation laser, 109 denotes a dichroic concave mirror, 110 denotes a concave mirror, and 111 denotes a laser input/output portion, the laser output portion 111 consisting of a polarizer 113 and a Pockels cell 114.

First, the operation of the regenerative amplifier shown in FIG. 3 shall be described.

The laser 106 is polarized in the direction of reflection from the polarizer 113 at the time of incidence. At the time of incidence of the laser beam, a voltage is applied to the Pockels cell 114, so as to rotate the polarization of the laser by 90° and take it into the laser resonator with the polarization transmitted by the polarizer 113.

In the laser resonator, a laser medium 104 is provided on the optical path of the laser between the planar reflective mirrors 103. The excitation laser device 105 shines an excitation laser 108 onto this laser medium 104. In order to allow the excitation laser 108 to provide an input, 109 is a dichroic mirror, selected such as to reflect the laser beam 106 which is to be amplified and transmit the excitation laser beam 108. The excitation laser device 105, mirrors 109 and 110 are positioned so that the areas in the laser medium 104 through which the laser beam 10 and the excitation laser beam 108 pass overlap, so as to allow efficient amplification of the laser beam 106.

The laser beam 106 which has been inputted to the resonator oscillates between the planar reflective mirrors 103 so as to pass through the laser medium 104 until reaching gain saturation. Then, voltage is applied to the Pockels cell 114 to rotate the polarization so as to be reflected by the polarizer 113, as a result of the which the laser beam 106 is reflected by the polarizer 113 to extract the amplified laser.

In this type of laser resonator, the thermal lensing effect often becomes a problem, particularly in solid laser media.

The thermal lensing effect as it pertains to laser media occurs when a portion of a laser beam passing through a laser medium is absorbed by the laser medium and consequently heats the laser medium. The resulting temperature gradient causes a corresponding refractive index gradient in the laser medium that gives rise to a lensing effect.

The thermal lensing effect normally forms the equivalent of a convex lens in the laser medium. Additionally, since this thermal lens changes the mode of the laser resonator, a deviation arises in the state of the laser spot diameter of the laser beam 106 and excitation laser 108 in the laser medium 104 of a regenerative amplifier as described above.

FIG. 4 shows a schematic representation of this, and is a schematic view for illustrating the state of laser passage through a laser medium in a conventional laser resonator. FIG. 4(a) shows the case where thermal lensing does not occur, and FIG. 4(b) shows the case where thermal lensing does occur.

In the state of FIG. 4(a) without thermal lensing, the laser beam 106 and excitation laser beam 108 roughly overlap inside the laser medium 104, and the excitation energy provided to the laser medium 104 by the excitation laser beam 108 can be efficiently used for amplification of the laser beam 106.

However, when thermal lensing occurs, there is a deviation between the states of the two laser beams, and when the state of overlap between the lasers in the laser medium 104 becomes poor as shown in FIG. 4(b), the amplification efficiency of the laser 106 is reduced. In the state shown in FIG. 4(b), the spot diameter of the laser 106 increases, as a result of which the laser 106 passes through much of the area in the laser medium 104 which has not been excited, thus reducing the efficiency. Additionally, only the area centered around the spot of the laser beam 106 is amplified, which results in reduced beam quality of the laser beam being used. Conversely to the case of FIG. 4(b), if the spot diameter of the laser 106 becomes smaller, then the laser beam 106 will pass through only a portion of the area of the laser medium amplified by the excitation laser beam 108. Therefore, only a portion of the energy which is invested by the excitation laser beam can be used, and this leads to reduced efficiency. Additionally, if the spot diameter of a laser is reduced in this way, the energy density increases and leads to damage in the laser medium.

While the effects of thermal tensing have been described here by taking as an example the spot diameter which is visually easy to grasp, the thermal tensing effect can also affect the modes of the laser beams inside the laser medium, thus also reducing the mode-matching between the laser beam and the excitation laser beam. This also leads to reduced efficiency and reduced beam quality.

This thermal lensing effect can be overcome by adequately cooling the laser medium, as long as the laser has a low output power. Additionally, in apparatus in which thermal tensing occurs, the state of the thermal lens remains mostly stable after reaching the steady state during operation, so that the shapes and positions of mirrors 109, 110 can be designed to optimally compensate for this state.

However, if the laser power is made higher, the thermal tensing effect in the laser medium will change during operation of the laser device or over repeated activity and suspension of the laser device, making it difficult to pre-emptively compensate for this effect in the design of the laser resonator. Specifically, the thermal tensing effect will vary with changes in the output power of the excitation laser beam, changes in the state of oscillation of the laser, and variations in the heat removing devices. If the state of the thermal lens in the laser medium changes considerably during the course of operation of the laser device, adjustments such as changes to the angles or movement of the positions of the mirrors 109, 110 must be made in order to compensate for this in conventional laser resonators. In order to do so, the operation of the laser device must be suspended, and time must be taken to perform work, thus making such compensation impractical.

BRIEF SUMMARY OF THE INVENTION

The present invention was made in view of the above-described problems, and has the object of offering a laser resonator capable of maintaining a high amplification efficiency even when the thermal tensing effect varies during operation or over repeated operation and suspension, as well as a method for adjusting a laser resonator therefor.

In order to overcome the above-described problems, a first embodiment of the present invention offers a laser resonator comprising a pair of reflection portions provided such as to allow a laser beam to oscillate therebetween; a laser medium provided on the optical path of the laser between the pair of reflection portions; an excitation portion for exciting the laser medium; an optical system provided on the optical path of the laser beam between the laser medium and the pair of reflection portions for changing the state of the laser in the laser medium; and a movement portion for moving the optical system along the optical axis of the laser.

Additionally, in the above-described embodiment, the present invention may be such that the optical system comprises a pair of optical elements provided at positions on opposite sides of the laser medium on the optical path of the laser beam between the laser medium and the pair of reflection portions; the excitation portion is an excitation laser device for directing an excitation laser beam onto the laser medium; or a dichroic mirror used for directing the excitation laser beam onto the laser medium along an optical axis roughly overlapping the laser beam is provided at least between the laser medium and the optical system.

According to another embodiment for overcoming the above-described problems, the present invention offers a method for adjusting a laser resonator as described above, comprising moving the optical system along the optical axis of the laser beam to change the state of the laser beam inside the laser medium.

As explained above, according to the present invention, even if the thermal lensing that occurs in a laser medium varies during operation or over repeated operation and suspension, the state of the mode patterns including the modes and spot diameter of the laser beam in the laser medium can be changed by moving an optical system along the optical axis of the laser beam by means of a movement portion, enabling the laser beam and the excitation laser beam to be matched, and allowing for swift adjustments to be made without suspending operation of the laser resonator, to maintain a high amplification efficiency.

Additionally, this type of adjustment function makes a cooling device in the laser medium unnecessary and can be employed even in devices with low power consumption, low cooling performance or low temperature adjustment precision, thus also contributing to reduced costs.

DETAILED DESCRIPTION OF THE INVENTION

Figure 1:
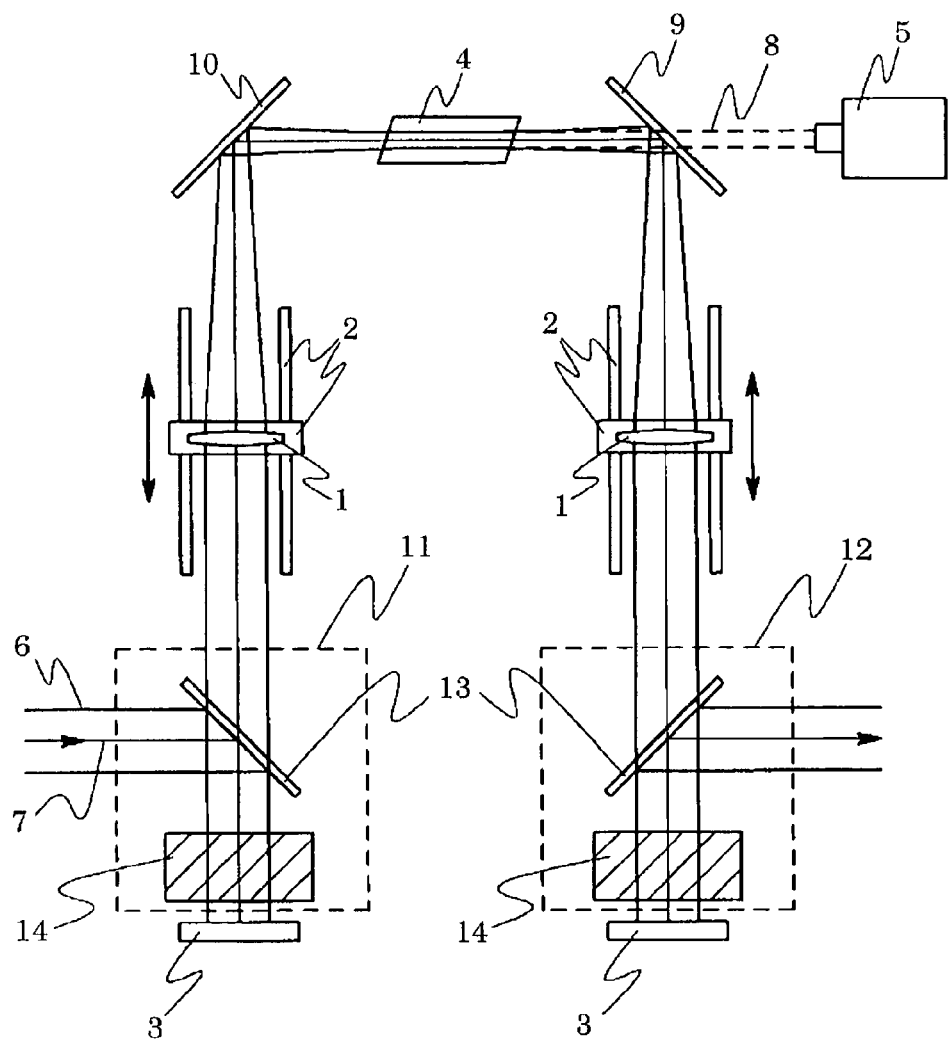
FIG. 1 is a schematic view of a regenerative amplifier according to an embodiment of the laser resonator of the present invention.

FIG. 1 is a schematic view showing a regenerative amplifier according to an embodiment of the laser resonator of the present invention. Herebelow, the present invention shall be described with reference to the specific embodiment shown in FIG. 1, but the present invention is not to be construed as being limited to this embodiment.

In FIG. 1, 1 denotes a convex lens (optical system), 2 denotes a moving portion, 3 denotes a planar reflective mirror (reflecting portion), 4 denotes a laser medium, 5 denotes an excitation laser device (excitation portion), 6 denotes a laser beam, 7 denotes an optical axis, 8 denotes an excitation laser beam, 9 denotes a dichroic mirror (folded mirror), 10 denotes a mirror (folded mirror), 11 denotes laser input portion, 12 denotes laser output portion, 13 denotes a polarizer and 14 denotes a Pockels cell.

In the embodiment of FIG. 1, a planar reflective mirror 3 is positioned to first reflect a laser beam 6 inputted from laser input portion 11 in the direction of the optical system 1, and an optical system 1 and mirror 10 with a moving portion 2 are placed linearly on the direction of reflection. The mirror 10 is oriented at an angle of 45 degrees with respect to the optical axis of the laser beam so as to bend the optical path of the laser beam by 90 degrees. Then, a dichroic mirror 9 with a reflective surface which is oriented at an angle of 45 degrees toward the mirror 10 with respect to the optical axis of the laser beam is provided so as to bend the optical path of the laser beam by 90 degrees with respect to the same direction as the mirror 10, and a laser medium 4 is provided between this dichroic mirror 9 and the mirror 10. Furthermore, an optical system 1 and a planar reflective mirror 3 are positioned linearly in the same manner as above in the direction of reflection of the dichroic mirror 9, and this second planar reflective mirror 3 is positioned so as to reflect the laser beam in the direction from which it came. Thus, the various elements are positioned so that the laser beam will oscillate between the two planar reflective mirrors 3 through the optical system 1, dichroic mirror 9, mirror 10 and laser medium 4. In FIG. 1, the laser output portion 12 is provided between the optical system 1 and the planar reflective mirror 3 as with the laser input means 11, such as to output the laser beam reflected by the planar reflective mirror 3. Additionally, the excitation laser device 5 for excitation of the laser medium is positioned on an extension of the optical path of the laser 6 between the laser medium 4 and the dichroic mirror 9 outside the dichroic mirror 9 so that an excitation laser beam 8 can be directed through the dichroic mirror 9 and onto the laser medium 4 in such a way as to overlap with the laser beam 6 and the optical axis.

Next, the operations of the device shown in FIG. 1 shall be briefly described.

The input of the laser beam 6 to the resonator and output from the resonator is performed by the laser input portion 11 and laser output portion 12. In the structure of FIG. 1, these consist of a polarizer 13 and Pockels cell 14, but the method for input and output of the laser beam is not particularly restricted.

The laser beam which has been inputted to the laser resonator passes several times through the areas of the laser medium 4 excited by the excitation laser beam 8 from the excitation laser device 5 while oscillating between the planar reflective mirrors 3 which form a pair of reflection portions, and is outputted upon reaching gain saturation.

As shown also in the embodiment of FIG. 1, the present invention comprises a pair of reflection portions (planar reflective mirrors 3) provided so as to allow a laser beam to oscillate therebetween, a laser medium 4 positioned on the optical path of the laser between said pair of reflection portions, an excitation portion (excitation laser device 5) for exciting the laser medium 4, an optical system (convex lens 1) positioned on the optical path of the laser between said laser medium and said pair of reflection portions for changing the state of the laser during the laser in the laser medium 4, and movement means for enabling said optical system to move along the optical axis of the laser.

According to this type of structure, even if the thermal lensing effect occurring in the laser medium 4 varies during operation or during repeated operation and suspension, or the effects of thermal lensing change due to control of the state of oscillation, the state of the laser in the laser medium 4 such as the mode pattern including the modes and the spot diameter can be changed by moving the convex lens 1 along the optical axis 7 of the laser beam by means of the movement portion 2, so as to match the laser beam 6 with the excitation laser beam 8, making swift adjustments possible without requiring operation of the laser resonator to be suspended, an d thereby maintaining a high amplification efficiency. Additionally, damage to the laser medium can also be prevented by reducing the laser spot diameter.

Figure 2:
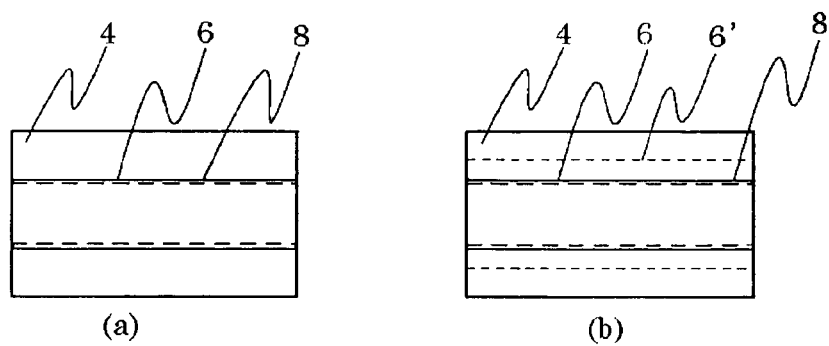
FIG. 2 is a schematic view for describing the states of passage of a laser beam and excitation laser beam in a laser medium according to an embodiment of the present invention, where (a) is a view without a thermal lensing effect, and (b) is a view showing the effect of correction by moving the optical system when thermal lensing occurs.

The effects of the present invention shall be described in detail with reference to FIG. 2 for the case of an embodiment using an excitation laser device 5 as the excitation portion. FIG. 2 is a schematic view for explaining the state of passage of the laser beam 6 and excitation laser beam 8 in the laser medium 4 according to an embodiment of the present invention. FIG. 2(*a*) illustrates the state when thermal lensing does not occur, and FIG. 2(*b*) illustrates the effects of correction due to movement of the optical system (convex lens 1) when thermal lensing does occurs In FIG. 2(*b*), 6' denotes the state of the laser when thermal lensing occurs, prior to correction by movement of the convex lens 1.

In the state of FIG. 2(*a*) where thermal lensing has not occurred, the laser beam 6 and the excitation laser beam 8 in the laser medium 4 roughly overlap, thus enabling the excitation energy conferred to the laser medium 4 by the excitation laser beam 8 to be efficiently used for amplification of the laser beam 6.

Figure 3:
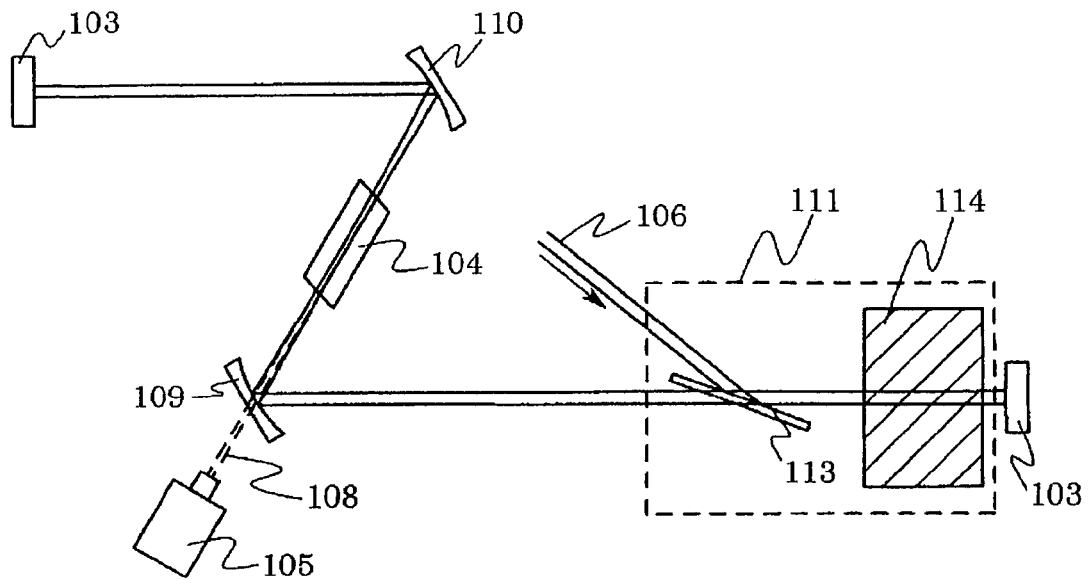
FIG. 3 is a schematic view of a regenerative optical amplifier using a conventional laser resonator.
Figure 4:
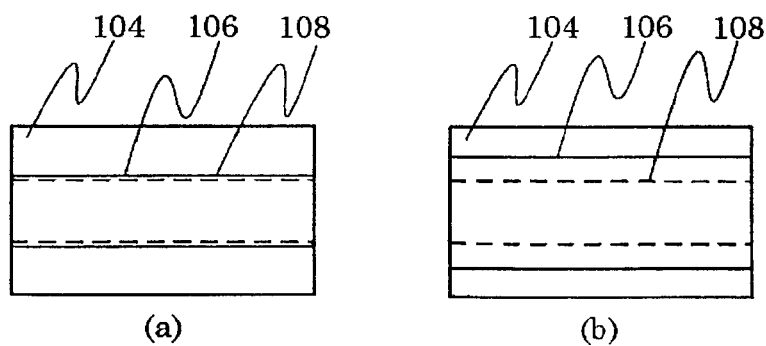
FIG. 4 is a schematic view for describing the states of passage of a laser beam and excitation laser beam in a laser medium according to a conventional laser resonator, where (a) is a view without a thermal lensing effect, and (b) is a view with a thermal lensing effect.

However, even if thermal lensing occurs and the state of the spot diameter of the laser beam 6 changes to the state of 6', unlike the case of the conventional laser resonators explained using the above-described FIG. 3 and FIG. 4, the convex lens 1 can be moved by the movement means 2 so as to change the state of the laser beam 6 as shown in FIG. 2(*b*) to match the laser beam 6 with the excitation laser beam 8, thus preventing reductions in efficiency and deterioration of laser beam quality as in the conventional art.

Additionally, according to the present invention, this type of adjustment function makes a laser medium cooling device unnecessary, and can be employed even in devices with low power consumption, low cooling performance or low temperature adjustment precision, thus also contributing to reduced costs.

The present invention is particularly effective in laser resonators using solid laser media which have heavy thermal lensing, such as those using YAG, sapphire or glass as the base material.

Aside from a single biconvex lens as shown in FIG. 1, the optical system may consist of a single planoconvex lens, or may consist of a plurality of lenses. However, if the optical system consists of a single lens, the lens must be positioned so that the optical axis passes through the center of the lens in order to prevent the optical axis of the laser beam from deviating. Additionally, an anti-reflective (AR) coating should preferably be provided on the surface of the lens.

The movement portion may be a conventional device such as a ball screw.

Preferably, the reflection portion comprises a planar reflective mirror 3 having a planar reflective surface as in the present embodiment, such that the laser beam forms a parallel beam to the optical system (convex lens 1). As a result, the loss during passage through optical elements used in a laser input portion or laser output portion such as a Pockels cell 14 can be reduced. Additionally, in the parallel beam portion, the spot diameter of the laser can be made larger than the laser medium 4, such as to reduce damage to the optical elements such as Pockels cells 14, while still obtaining a high gain in the laser medium 4.

More specifically, as shown in FIG. 1, the optical system comprises a pair of optical systems (convex lenses 1) provided at opposing positions on either side of the laser medium 4 on the optical path of the laser beam between the laser medium 4 and the pair of reflection portions (planar reflective mirrors 3), and more preferably, each of the pair of optical systems has the same structure.

By positioning the optical systems in this way, the uniformity of the state of the laser such as the spot diameter in the laser medium 4 along the direction of passage of the laser beam can be readily maintained. Additionally the structure is a simple one in which identical single lenses are positioned opposite each other, thus also simplifying design and production of the laser resonator and reducing costs as well.

Additionally, as shown in FIG. 1, disturbances in the horizontal mode pattern of the laser can be readily suppressed in the laser resonator, by providing the optical system and laser input means and laser output means at opposite positions of the laser medium, so as to enable a laser beam with high beam quality to be obtained.

Additionally, as shown in FIG. 1, the excitation portion is preferably an excitation laser device 5 for illuminating the laser medium 4 with an excitation laser beam 8, as a result of which the excitation region inside the laser medium can be readily made to match the laser beam passage area. Particularly with respect to the present invention, the use of this type of excitation laser beam enables outstanding effects to be gained, such as being able to adjust the states of the excitation laser beam and laser beam including the modes and spot diameters so as to match them inside the laser medium. However, the present invention is effective even if the excitation portion is not an excitation laser device for illuminating the laser medium with the excitation laser beam roughly overlapping with the optical axis of the laser beam as shown in FIG. 1, and can be used with respect to any type of excitation portion which is susceptible to changes in the thermal tensing of the laser medium.

Furthermore, in the present invention, as shown in FIG. 1, a dichroic mirror used for illuminating the laser medium with the excitation laser beam so that the optical axis roughly overlaps with the laser beam can be positioned between the laser medium and at least one of the optical systems, and this type of arrangement is preferable. As a result, even if the thermal lensing which occurs in the laser medium varies during operation or over repeated operation and suspension in a laser resonator using an excitation portion for illuminating the laser medium with an excitation laser beam so that the optical axis roughly overlaps with that of the laser beam, swift adjustments can be made without suspending operation of the laser resonator. Furthermore, by positioning the dichroic mirror near the laser medium, a lens with a short focal distance can be used as the condensing means of the excitation laser beam. As a result, an excitation laser device with poor condensing properties can be used, thus enabling reductions in cost.

What is claimed is:

1. A laser resonator comprising:
   a pair of reflection portions provided such as to allow a laser beam to oscillate therebetween;
   a laser medium provided on the optical path of the laser between said pair of reflection portions;
   an excitation portion for exciting said laser medium;
   a pair of optical systems provided on the optical path of said laser beam between said laser medium and said pair of reflection portions respectively for changing the state of the laser in said laser medium; and
   a pair of movement portions for moving said optical systems respectively along the optical axis of the laser.

2. A laser resonator in accordance with claim 1, wherein said optical systems are provided symmetrically at positions on opposite sides of the laser medium on the optical path of the laser beam between said laser medium and said pair of reflection portions.

3. A laser resonator in accordance with claim 1, wherein said excitation portion is an excitation laser device for directing an excitation laser beam onto said laser medium.

4. A laser resonator in accordance with claim 3, wherein a dichroic mirror used for directing the excitation laser beam onto said laser medium along an optical axis roughly overlapping said laser beam is provided at least between said laser medium and said optical system.

5. A method for adjusting a laser resonator according to claim 1, comprising moving said optical system along the optical axis of said laser beam to change the state of the laser beam inside said laser medium.

* * * * *

UNITED STATES PATENT AND TRADEMARK OFFICE
CERTIFICATE OF CORRECTION

PATENT NO. : 7,012,940 B2 Page 1 of 1
APPLICATION NO. : 10/619303
DATED : March 14, 2006
INVENTOR(S) : Yusuke Tamaki et al.

It is certified that error appears in the above-identified patent and that said Letters Patent is hereby corrected as shown below:

Column 2, line 27, please delete "tensing", and insert therefor --lensing--.

Column 2, line 29, please delete "tensing", and insert therefor --lensing--.

Column 2, line 42, please delete "tensing", and insert therefor --lensing--.

Column 2, line 46, please delete "tensing", and insert therefor --lensing--.

Column 2, line 65, please delete "tensing", and insert therefor --lensing--.

Signed and Sealed this

Twelfth Day of September, 2006

JON W. DUDAS
*Director of the United States Patent and Trademark Office*